US007949343B2

(12) United States Patent
Kermoal et al.

(10) Patent No.: US 7,949,343 B2
(45) Date of Patent: May 24, 2011

(54) METHOD AND APPARATUS FOR ADJUSTING GUARD BAND SIZE BETWEEN TWO CARRIERS BY QUALITY OF SERVICE DATA POSITIONING IN THE SPECTRUM BAND

(75) Inventors: Jean-Philippe Kermoal, Copenhagen (DK); Kari Hooli, Oulu (FI)

(73) Assignee: Nokia Corporation, Espoo (FI)

(*) Notice: Subject to any disclaimer, the term of this patent is extended or adjusted under 35 U.S.C. 154(b) by 733 days.

(21) Appl. No.: 11/901,956

(22) Filed: Sep. 18, 2007

(65) Prior Publication Data
US 2008/0070586 A1 Mar. 20, 2008

Related U.S. Application Data

(60) Provisional application No. 60/845,562, filed on Sep. 18, 2006.

(51) Int. Cl.
*H04W 72/00* (2009.01)
(52) U.S. Cl. .................. 455/452.2; 455/453; 455/464
(58) Field of Classification Search ................ 455/452.2
See application file for complete search history.

(56) References Cited

U.S. PATENT DOCUMENTS

| 6,564,061 B1 * | 5/2003 | Guo et al. ............... 455/452.1 |
| 6,865,169 B1 * | 3/2005 | Quayle et al. ............ 370/335 |
| 6,882,693 B2 * | 4/2005 | Ozeki et al. ............. 375/345 |

FOREIGN PATENT DOCUMENTS

| EP | 1494490 A1 | 1/2005 |
| GB | 2436418 A | 9/2007 |

OTHER PUBLICATIONS

Leaves, P.; Moessner, K.; Tafazolli, R.; Grandblaise, D.; Bourse, D.; Tonjes, R.; Breveglieri, M.; , "Dynamic spectrum allocation in composite reconfigurable wireless networks," Communications Magazine, IEEE , vol. 42, No. 5, pp. 72-81, May 2004 doi: 10.1109/MCOM.2004.1299346 URL: http://ieeexplore.ieee.org/stamp/stamp.jsp?tp=&arnumber=1299346&isnum.*

(Continued)

*Primary Examiner* — Charles N Appiah
*Assistant Examiner* — Stamford Hwang
(74) *Attorney, Agent, or Firm* — Ware, Fressola, Van Der Sluys & Adolphson LLP

(57) ABSTRACT

The guard band between two carriers of the same or different operators is reduced or dynamically adjusted by initiating a dynamic change request of the guard band between the two carriers to allow for flexible spectrum use by adjusting the tolerable guard band overlap. The data is distributed or positioned in the carrier spectrum band as a function of the Quality of Service so that the lowest Quality of Service constrained data are positioned at the edges of the carrier spectrum band and the highest Quality of Service constrained data are positioned in the middle of the carrier spectrum band to minimize any impact from the increased adjacent channel interference due to the guard band overlap and narrower guard band.

14 Claims, 16 Drawing Sheets

OTHER PUBLICATIONS

Hooli, K et al: "Flexible Spectrum Use between WINNER Radio Access Networks", in Proc. IST Mobile & Wireless, Myconos (Greece). Jun. 4-8, 2006, retrieved from: www.cttc.es/resources/doc/071115-164-hooliistsummit2006-19118.pdf, section I-III, V, abstract.

Mokhtar, Rania A et al: "Cognitive Radio Technology for Flexible SpectrumSharing" Research and Development, 2006. SCOReD 2006. 4$^{th}$ Student Conference on, Jun. 27-28, 2006 retrieved from: http://ieeexplore.ieee.org/xpls/abs_all.Jsp?arnumber=4339305, section I-VII, abstract.

IST-2003-507581 WINNER D6.3 V1.0, "WINNER Spectrum Aspects: Assessment report", Dec. 31, 2005, pp. 1-58.

"Dynamic Spectrum Allocation (DSA) and Reconfigurability" David Grandblaise, Didier Bourse, Klause Moessner, Paul Leaves, Motorola European Communications Research Lab, Gif-sur-Yvette, The University of Surrey, Guildford, Surrey, United Kingdom.

* cited by examiner

The Basic Method

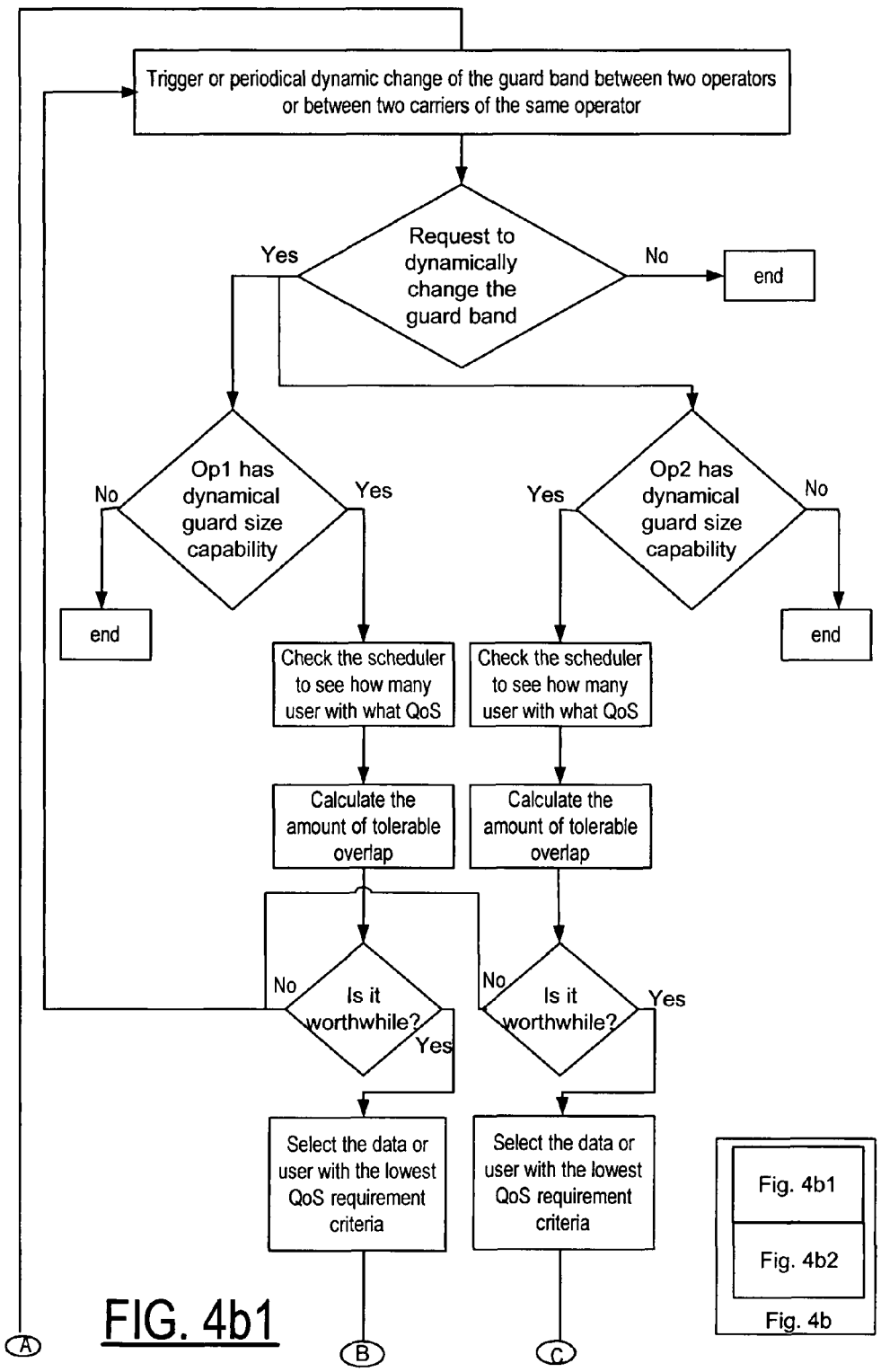

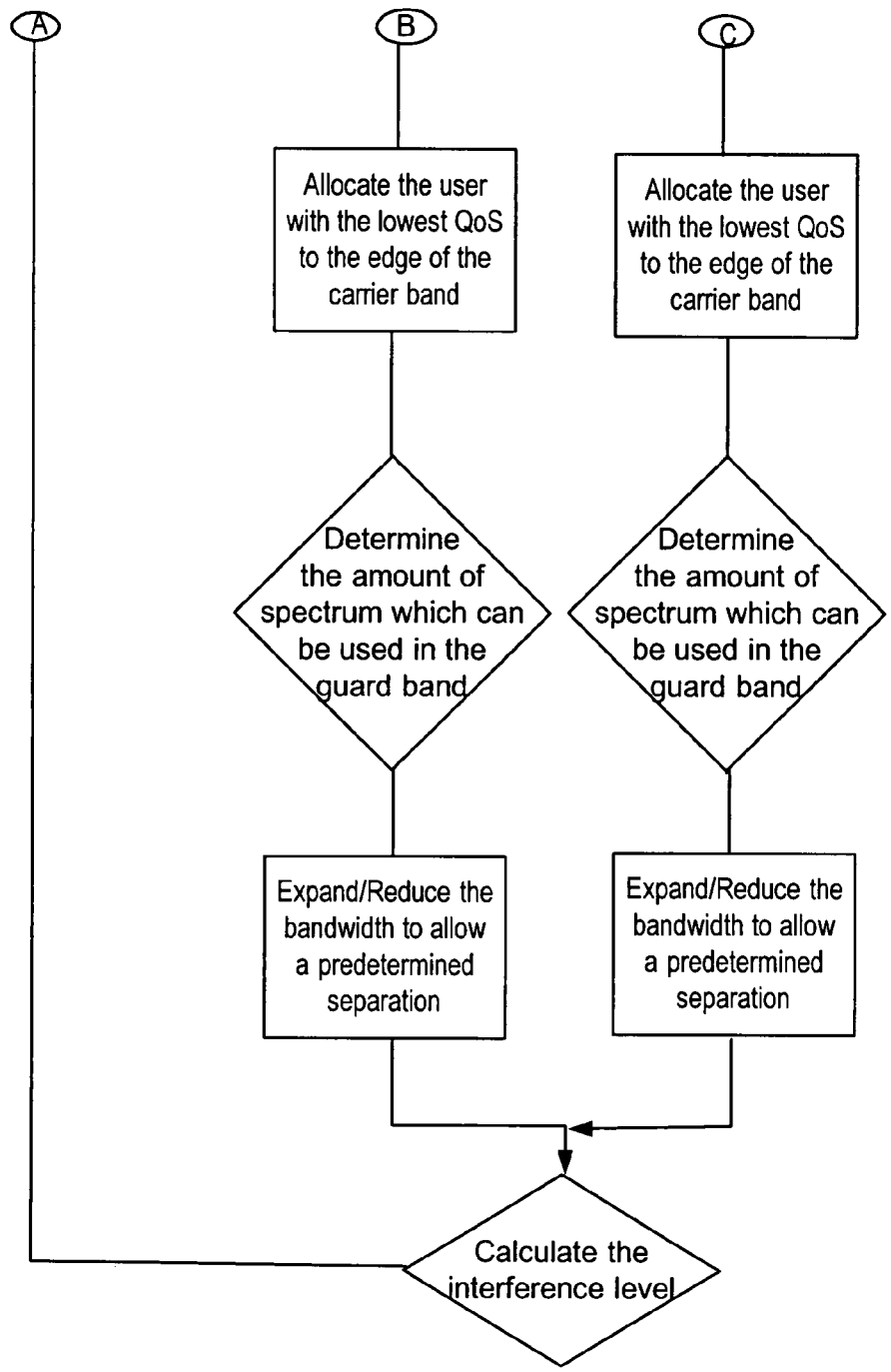
FIG. 4b2

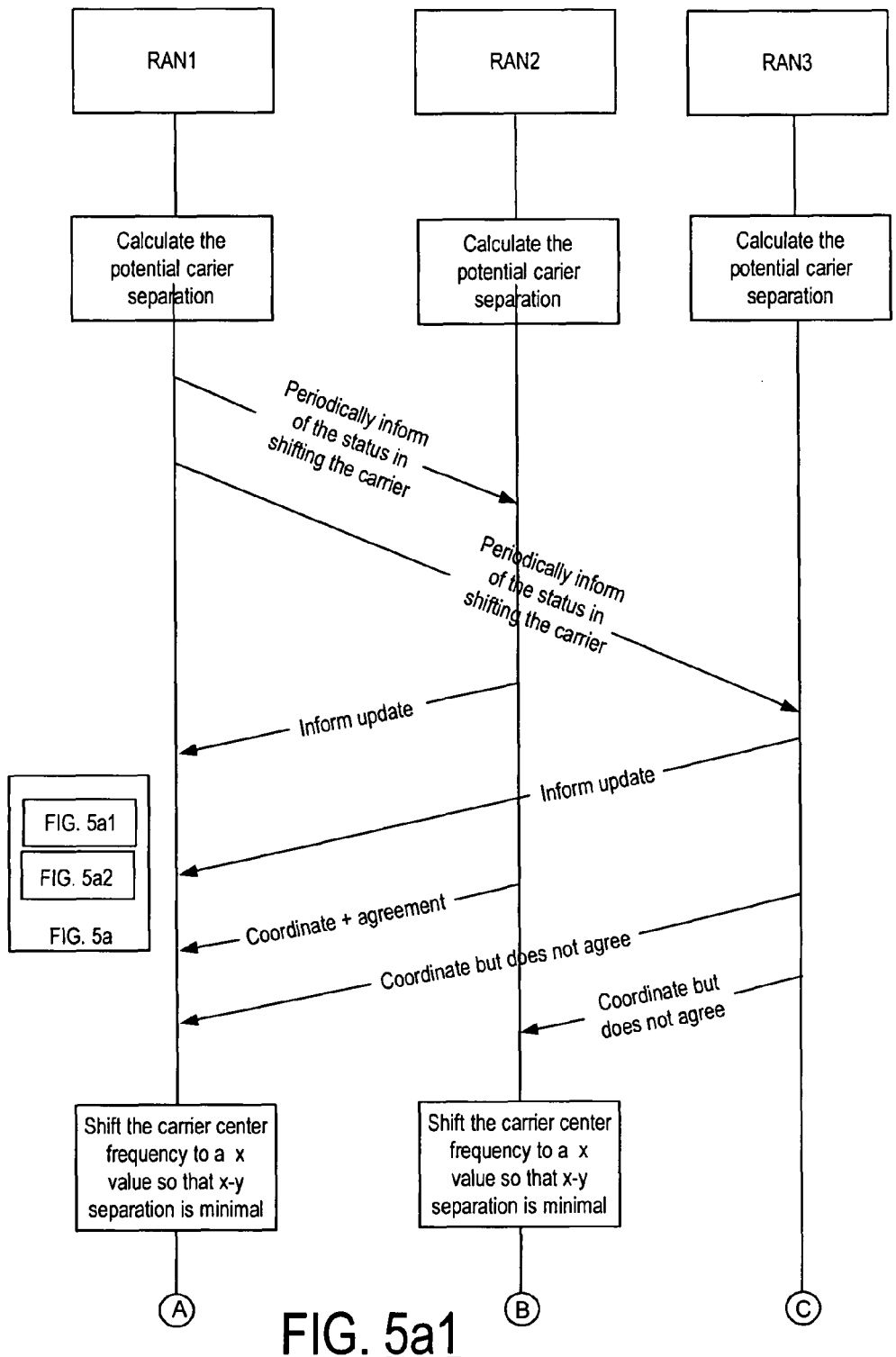
FIG. 5a1

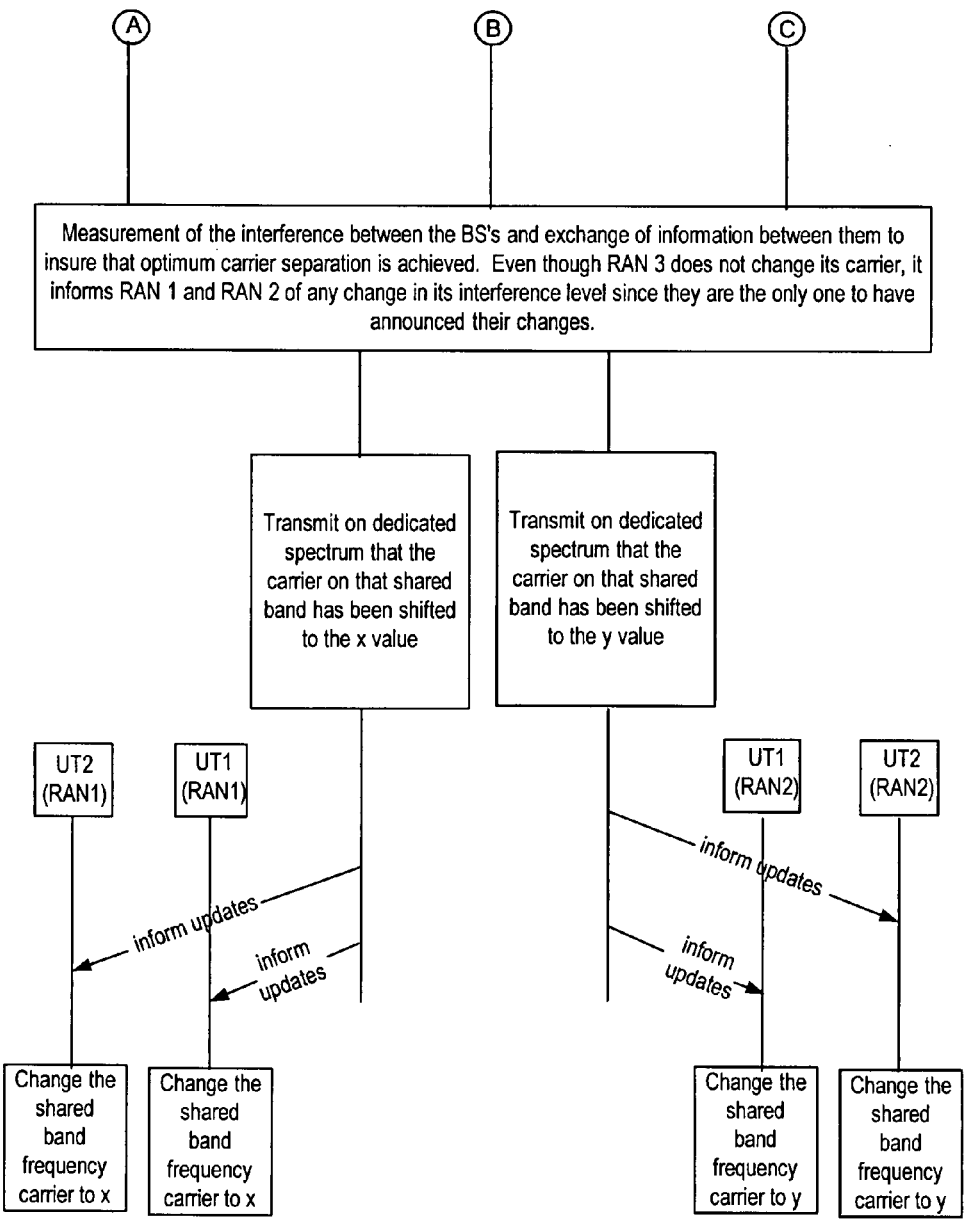
FIG. 5a2

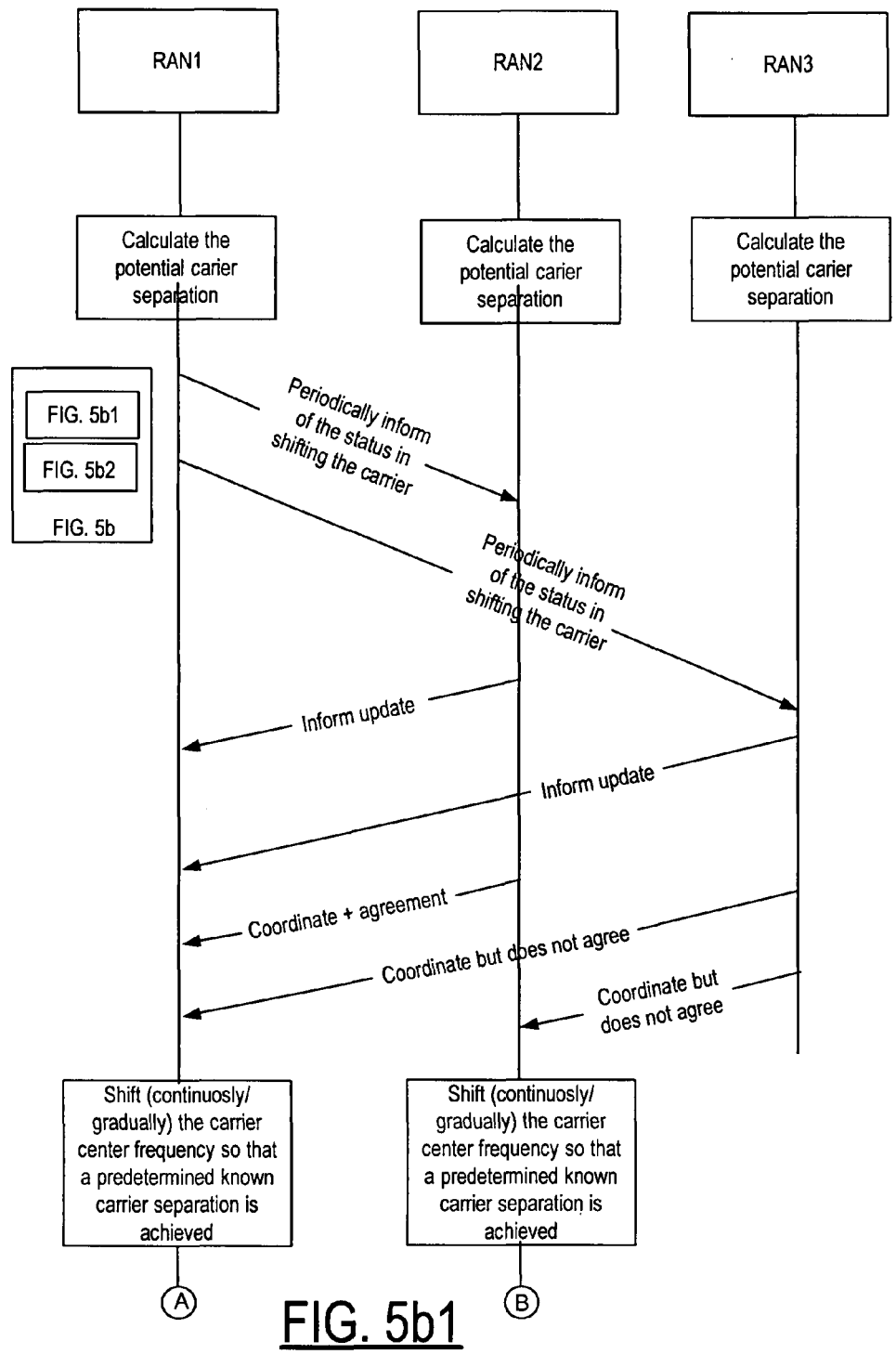
FIG. 5b1

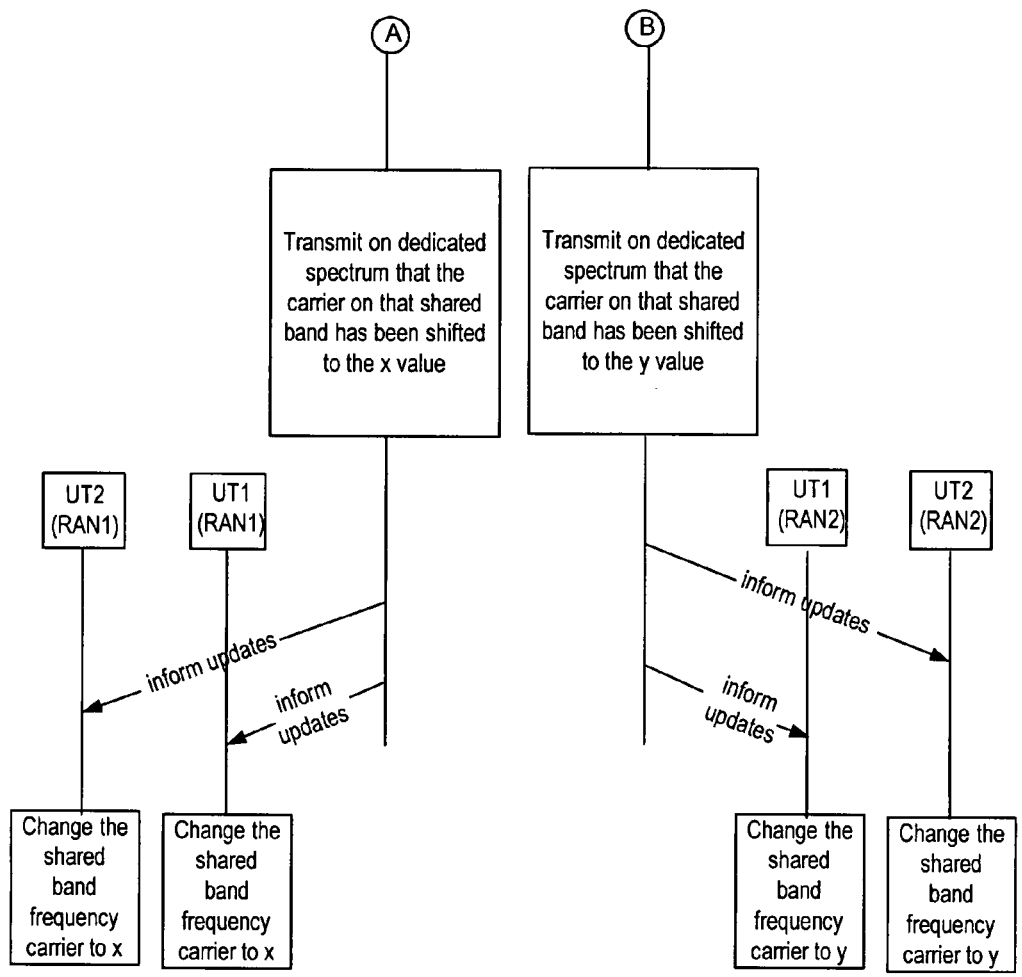
FIG. 5b2

Adjustable Guard Band Enabled Apparatus triggering module configured for initiating a dynamic change request of the guard band between two carriers of different or the same operator guard band overlap module configured for determining a tolerable overlap for adjacent channel interference bandwidth adjusting module configured for expanding or reducing the bandwidth to achieve a carrier separation as a function of the Quality of Service data positioning module configured for positioning data in accordance to its Quality of Service and in accordance with available guard band frequency spectrum other adjustable guard band enabled apparatus modules

FIG. 6

METHOD AND APPARATUS FOR ADJUSTING GUARD BAND SIZE BETWEEN TWO CARRIERS BY QUALITY OF SERVICE DATA POSITIONING IN THE SPECTRUM BAND

CROSS-REFERENCE TO RELATED APPLICATION

This application claims priority from U.S. Provisional Patent Application No. 60/845,562 filed Sep. 18, 2006.

FIELD OF THE INVENTION

The invention relates generally to the field of wireless communication systems and spectrum use and deals more particularly with reducing or dynamically adjusting the guard band between two adjacent carriers to allow for flexible spectrum use.

BACKGROUND OF THE INVENTION

A guard band is placed between carriers in wireless communication systems to prevent excessive adjacent channel interference (ACI). In the design of a guard band, difficult and complex ACI scenarios are emphasized, which to be accommodated results in large guard bands and, in a sense, a waste of spectrum. On the other hand, if the guard band is narrow, ACI becomes a problem especially on the edges of the carrier spectrum as illustrated in FIG. 1 by the over-lapping edge portions in which there is a high level of ACI.

The spectral resources in wireless communications systems are assigned to operators in a fixed manner. The scarce spectral resources could be used more efficiently if the assignment to the operators could be made with some flexibility.

Flexible Spectrum Use (FSU) aims at adapting the available spectrum to a network to reflect the changes on the number of subscribers as well as on daily traffic patterns. FSU should enable more versatile operation of the networks, for example, with varying traffic loads in the networks or with some operators providing more focused coverage than others. FSU should provide enough system flexibility towards geographical differences in regulatory spectrum assignments. FSU also aims at easing the deployment of multiple RANs at the launch of the system, even when the spectrum is made available gradually according to increasing traffic demands. Such flexibility may turn out to be of particular importance for the B3G systems requiring wide spectrum bands on frequencies suitable for efficient vehicular communications, that is, below 6 GHz.

Some approaches for flexible spectrum use (FSU) are presented in EU IST WINNER Phase I (IST-2003-507581 WINNER D6.3 WINNER Spectrum Aspects: Assessment report, 2005), and EU IST OverDRiVE projects (IST-2001-35125 OverDRiVE D13 Specification and Performance of Dynamic Spectrum Allocation), both of which are incorporated herein by reference as though fully set forth herein. Further approaches for flexible spectrum use (FSU) are presented in other research projects related to spectrum sharing.

The above referenced approaches for flexible spectrum use (FSU) require either accurate synchronization, coordination between carrier operators or exchanges of full carriers. The requirements of the above referenced approaches for flexible spectrum use (FSU) are frequently problematic, complex and difficult to implement.

BRIEF DESCRIPTION OF THE DRAWINGS

FIG. 6 shows an adjustable guard band enabled apparatus according to some embodiments of the invention.

SUMMARY OF THE INVENTION

The present invention provides a method and apparatus that features reducing or dynamically adjusting the guard band between two carriers of the same or different operators by initiating a dynamic change request of the guard band between two carriers to allow for flexible spectrum use between carriers by adjusting the tolerable guard band overlap. The data is distributed or positioned in the carrier spectrum band as a function of the Quality of Service so that the lowest Quality of Service constrained data are positioned at the edges of the carrier spectrum band and the highest Quality of Service constrained data are positioned in the middle of the carrier spectrum band to minimize any impact from the increased adjacent channel interference due to the guard band overlap and narrower guard band.

WRITTEN DESCRIPTION OF EXEMPLARY EMBODIMENTS OF THE INVENTION

Figure 1:
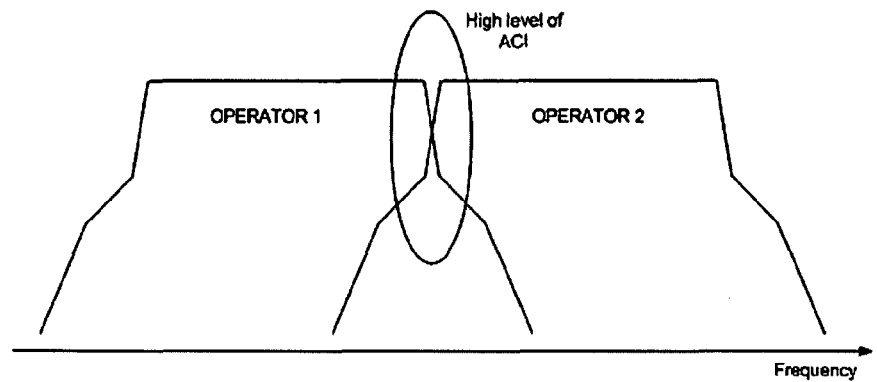
FIG. 1 is an illustrative example of adjacent channel interference (ACI) between two carriers which may belong to the same operator or different operators.
Figure 2:
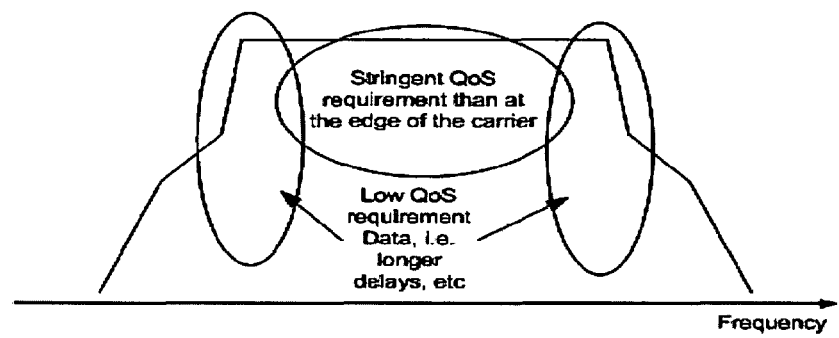
FIG. 2 is an illustrative example of the spectrum structure of the invention with respect to the positioning of the user/data with low Quality of Service requirements and the positioning of user/data with higher Quality of Service requirements.

To some extent the spectral shoulders' of the carriers or even carriers are allowed to overlap, and the resource units (chunks) on the carrier edges are used for data without stringent delay requirements. In other words, the tendency for interference at the chunks at the edges of signal band is taken into account at the scheduler. The placement of low QoS data or information and stringent QoS data or information is illustrated in FIG. 2. The necessary, basic control information is located in the middle of the spectrum so that it does not suffer from the increased ACI.

Figure 3:
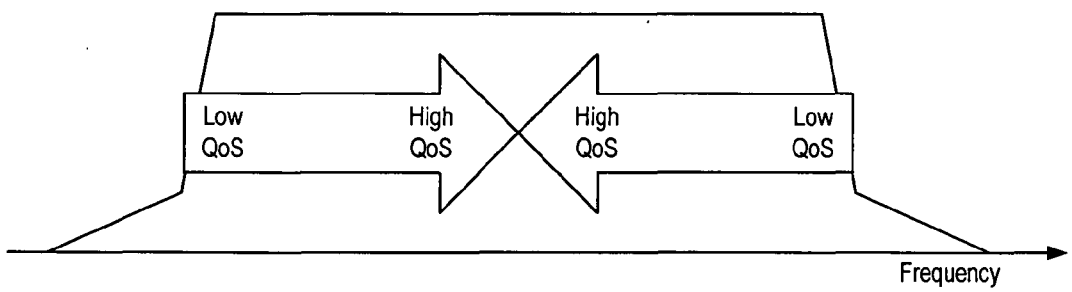
FIG. 3 is an illustration of the arrangement of the data in the spectrum band in accordance with the invention as a function of the data Quality of Service.
Figure 4A:
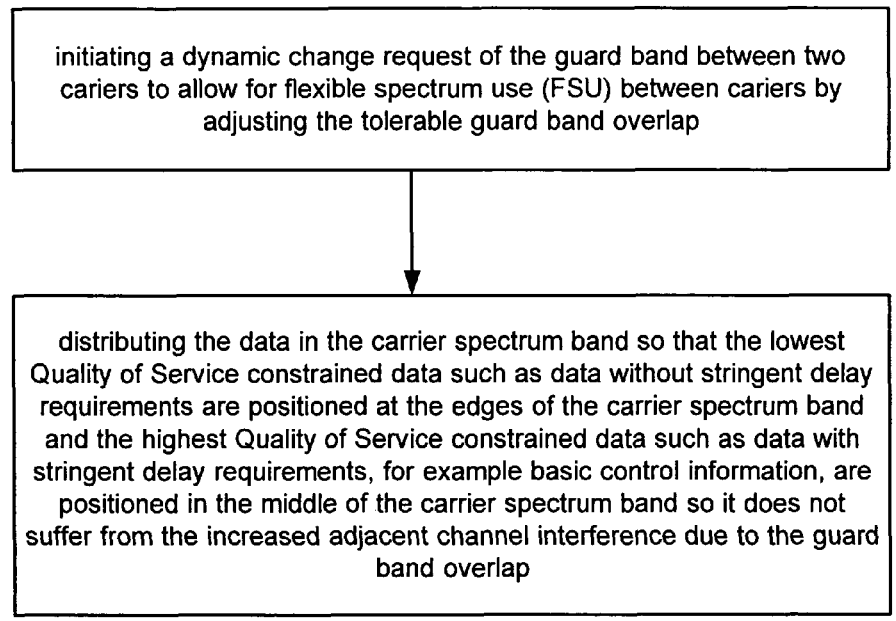
FIG. 4a shows a flowchart of the basic steps of some embodiments of the present invention.
Figure 4B:
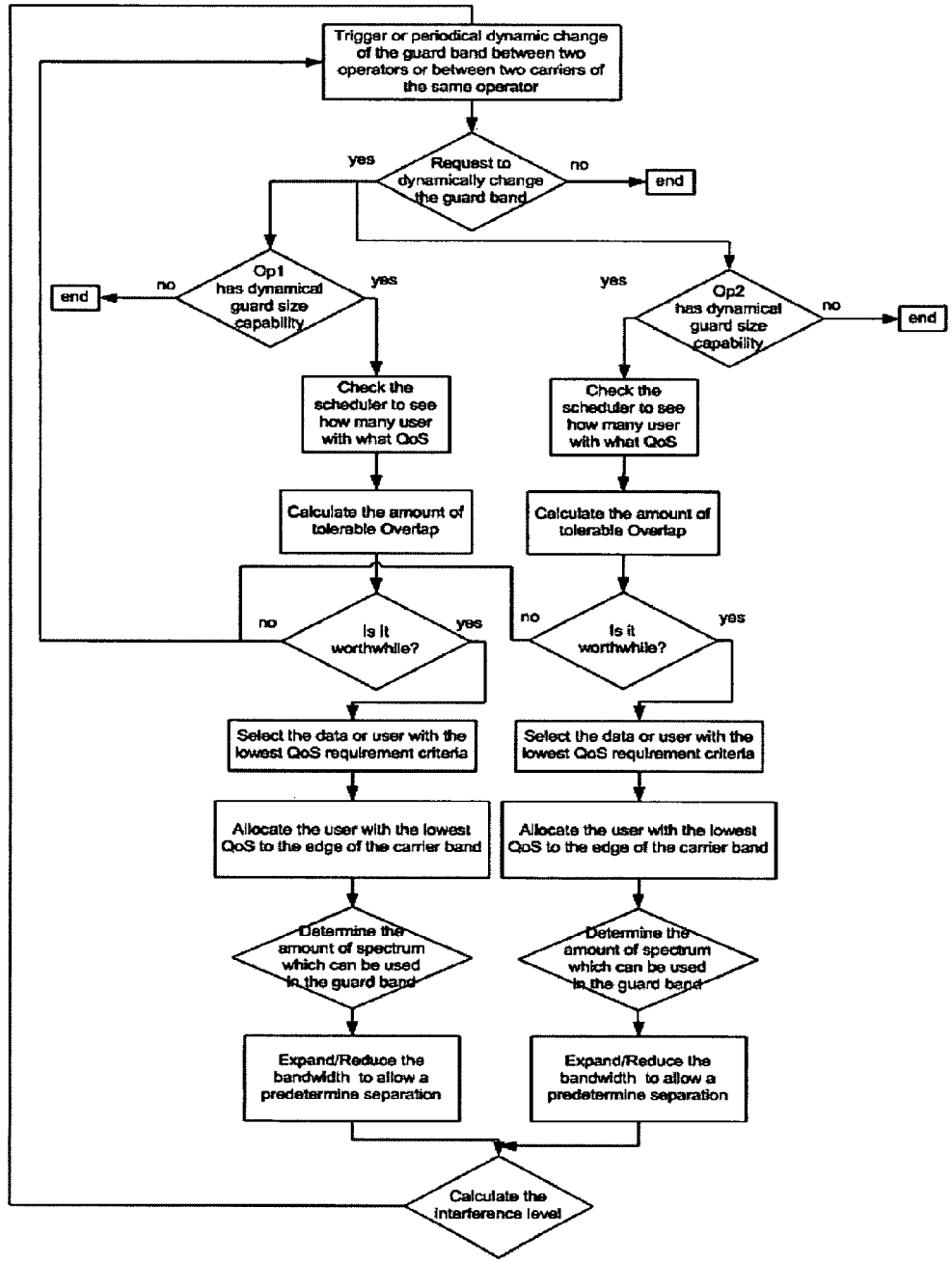
FIG. 4b shows a flow chart describing an example of one way to dynamically vary the carrier separation between two operators in accordance with some embodiments of the invention. It should be noted that synchronization is not required between the two carriers, but coordination is necessary in this example.
Figure 5A:
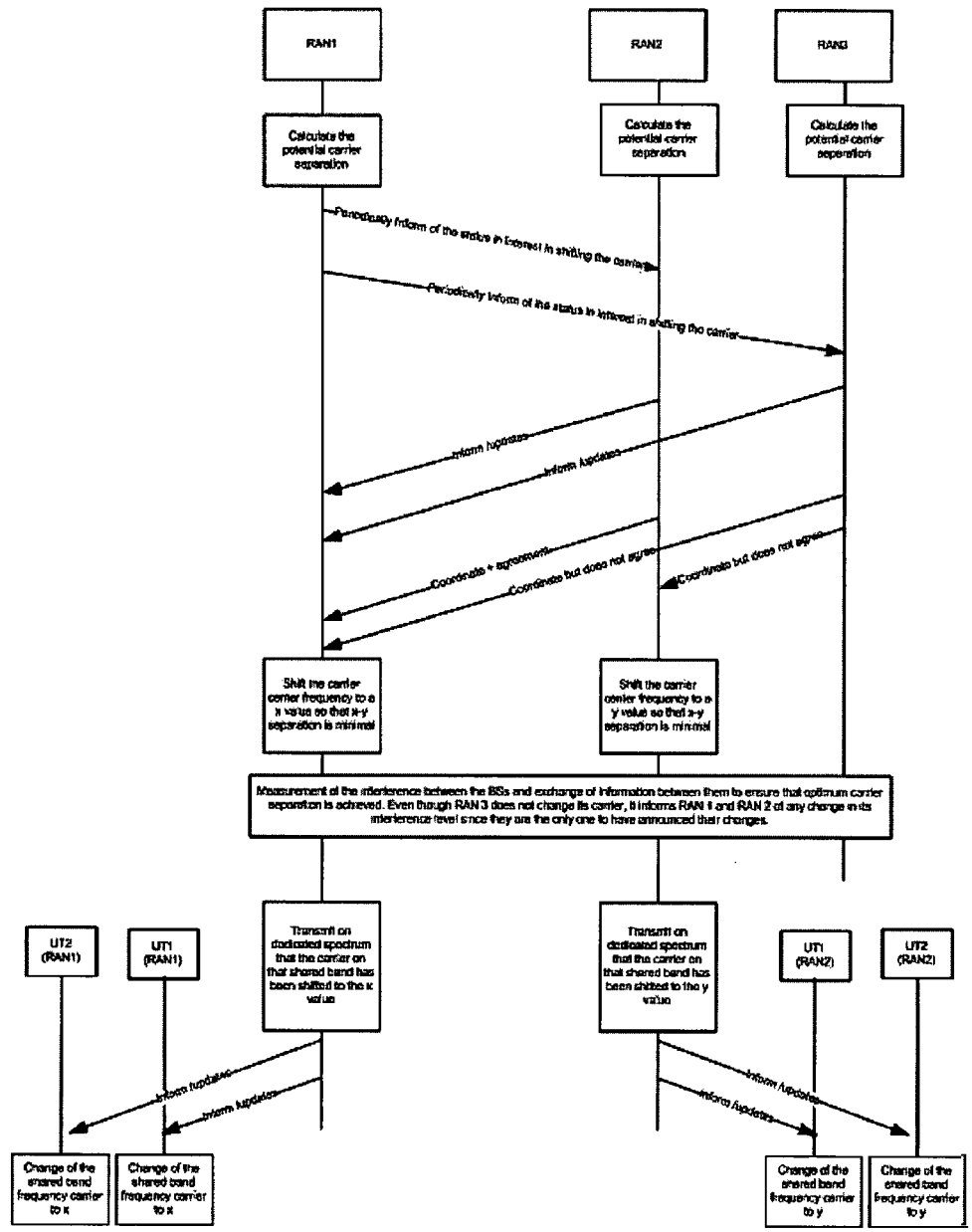
FIG. 5a illustrates an example of a system for coordination between two RANs for shifting their respective carrier frequency to minimize the guard band size in accordance with some embodiments of the invention. On-line ACI measurement is used in this example to ensure that optimum carrier separation is achieved.
Figure 5B:
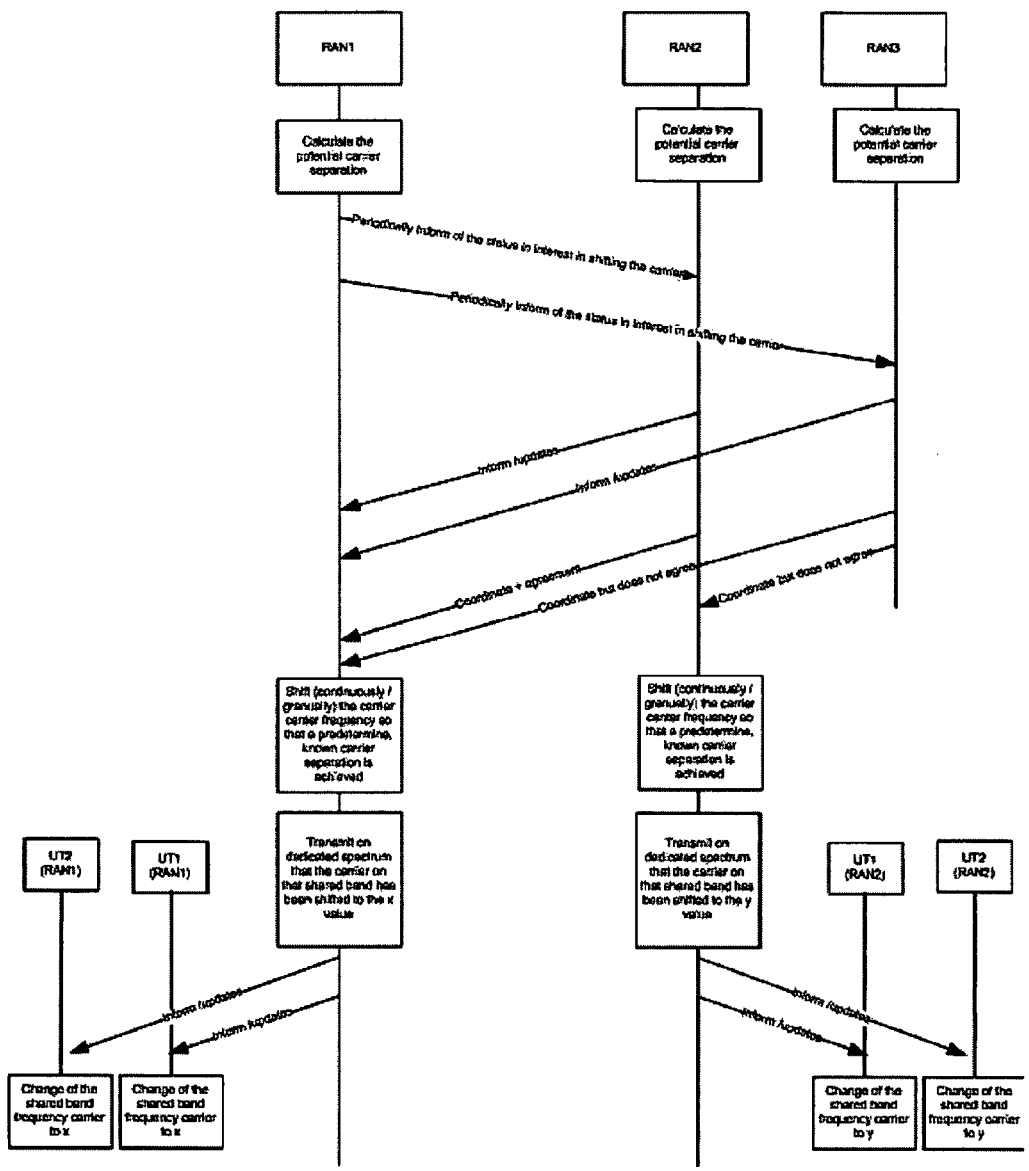
FIG. 5b illustrates an example of a system for coordination between two RANs for shifting their respective carrier frequency to minimize the guard band size in accordance with some embodiments of the invention. In the illustrated system of this example, a predetermined value approach is considered to remove the need for on-line ACI measurements and to reduce the amount of control signaling necessary to achieve the predetermined separation.

In transmission, the schedulers position the data that requires lower QoS to the edge of the carrier and position the highest QoS constrained data to the middle of the carrier as illustrated for example, in FIG. 3 where the low QoS data is positioned at the edges of the spectrum band and the higher QoS data is positioned nearer the middle of the spectrum band.

In some embodiments of the invention, synchronization between operators is not necessary because if as "a rule" the operators organize their respective chunk in such a manner that they expect higher interference level on the edge of the guard band, the data can be encoded with a lower coding rate. In these embodiments, the concept of the invention is more suitable for FDD systems than for TDD systems where inter-operator synchronization is likely needed due to other reasons.

The carriers are allowed to partially overlap, and the resource units (chunks) on the carrier edges are used for data without stringent delay requirements. Chunks refer to the basic time-frequency resource unit for links, consisting of a rectangular time-frequency area that comprises a number of subsequent symbols and a number of adjacent sub-carriers. The necessary, basic control information is located in the middle of the carrier so that it does not suffer from the increased ACI.

In accordance with some embodiments of the invention, the carrier separation is dynamically adjusted e.g. by extending or reducing the carrier bandwidth. It can be based on a continuous, e.g. non-discrete, shift of the guard band controlled by an interference level measurement on the chunks at the carrier edge made on-line by the BSs of the RANs. The calculated guard-band size is quantized to an agreed resolution.

The extension/reduction of the carrier bandwidth may use a certain spectrum granularity like for instance every 1 MHz (this is just an example and does not bind this invention to this value only). The frequency separation can be controlled by the BSs based on the on-line measurements.

In the case of discrete shift of the carrier, e.g. using predetermined frequency value, and depending on the size of the spectrum band at the edge with low QoS requirement (loose delay requirements), a predetermined set of carrier separations may be used. These carrier separations would have been pre-calculated as a function of the size of the low QoS band. A pre-calculated carrier separation table could be used. This may reduce the accuracy level of the optimum separation but it would reduce the amount of signaling.

In order to communicate the new carrier center frequency and bandwidth to the UT, the BSs of the concerned RANs broadcast or unicast to its UTs the new frequency information as part of system information on the middle part of the carrier.

In some embodiments, the invention may be either triggered by one of the RAN's due to its current or predicted load or it could be periodical. A periodical solution may need more signaling.

It should be noted that some of the embodiments of the invention relate to its use with any B3G technology. In the B3G context, future mobile communication systems may have wide bandwidth and fine resource allocation granularity in frequency, e.g. as it is considered in the WINNER concept with 100 or 50 MHz or LTE with 20 MHz. Wide bandwidth and fine resource allocation granularity in frequency are not strict requirements for the use of invention, although they are beneficial for the invention.

It will also be recognized that some embodiments of the invention can be used by any wireless communication system which is facing similar ACI problems. This includes any beyond third generation (B3G) system such as the WINNER system currently researched in the WINNER project. The term WINNER is exemplary and the invention is not limited to the WINNER system.

In some embodiments, the invention permits implementation of FSU in FDD systems without stringent requirements of inter-operator synchronization or exchanges of whole carriers through the adjustment of the carrier separation. Nevertheless, inter-operator synchronization is required if the invention is applied to TDD systems.

In some embodiments of the invention, FSU is in principle implemented so that the operator releasing spectrum reduces the used bandwidth and the other operator expands the bandwidth it uses (together with related carrier shifts). The B3G air interfaces are likely sufficiently agile to support relatively dynamical changes on the bandwidth as can be noted from the developed WINNER concept.

From a practical standpoint some form of coordination between operators is likely needed. For example, synchronization and coordination could be used to improve the "fine tuning" of the carrier separation.

In some embodiments, the invention is mainly related to uplink where MS-to-BS ACI is random and bursty due to the packet transmission type. Interference prediction would be difficult in UL due to packet transmissions and frequency domain scheduling.

The interference prediction could be considered in DL where BS transmission on the adjacent channel would be more predictable since BS serves several UTs resulting in steadier stream of transmitted data. However, the prediction still would be essentially a time-average interference level related to average load on the interfering cell.

The invention is not bound to FSU only. In cases where the B3G system does not support FSU, the concepts of invention may still be employed to allow operators to efficiently use the spectrum so that the minimum guard band is used between spectrally adjacent carriers.

The invention involves or is related to cooperation between elements of a communication system. Examples of a wireless communication system include implementations of GSM (Global System for Mobile Communication) and implementations of UMTS (Universal Mobile Telecommunication System). These elements of the communication systems are exemplary only and does not bind, limit or restrict the invention in any way to only these elements of the communication systems since the invention is likely to be used for B3G systems. Each such wireless communication system includes a radio access network (RAN). In UMTS, the RAN is called UTRAN (UMTS Terrestrial RAN). A UTRAN includes one or more Radio Network Controllers (RNCs), each having control of one or more Node Bs, which are wireless terminals configured to communicatively couple to one or more UTs. The combination of an RNC and the Node Bs it controls is called a Radio Network System (RNS). A GSM RAN includes one or more base station controllers (BSCs), each controlling one or more base transceiver stations (BTSs). The combination of a BSC and the BTSs it controls is called a base station system (BSS).

Figure 7:
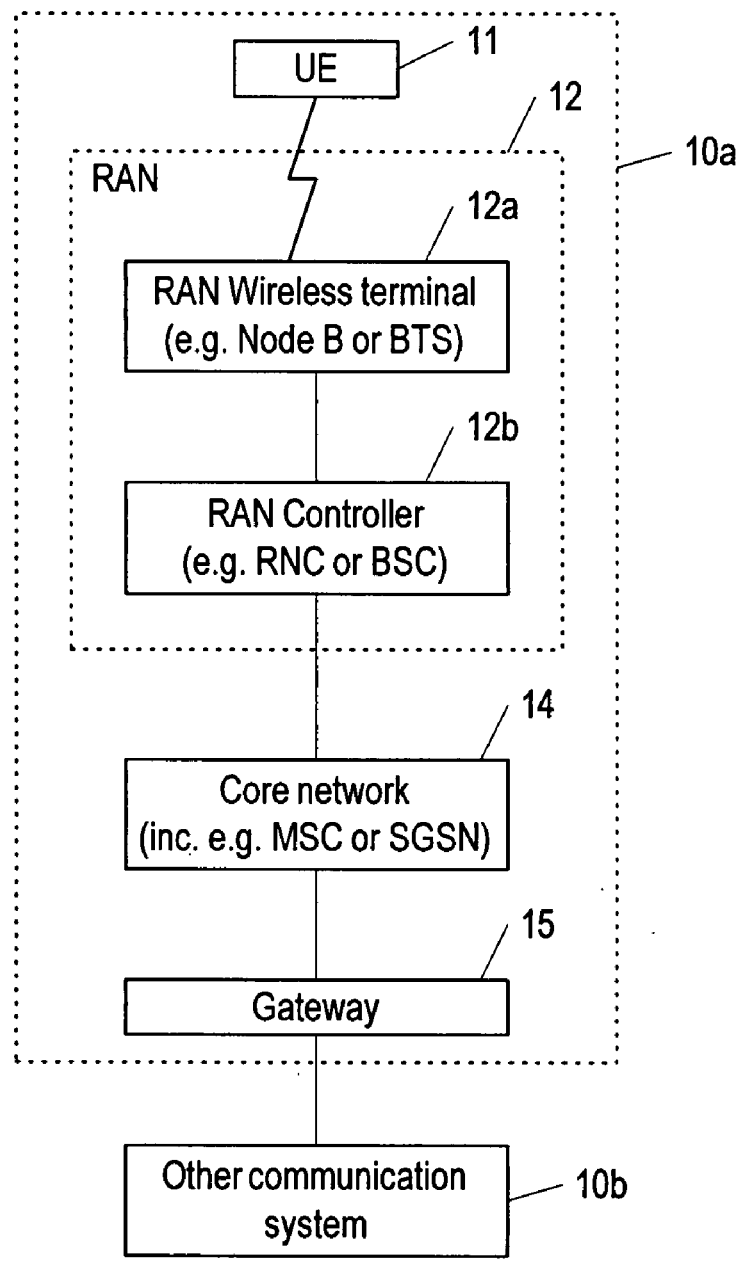
FIG. 7 is a block diagram/flow diagram of a wireless communication system in which the present invention may be implemented, including various communication terminals, and in particular a user equipment (UT) terminal and a wireless terminal of a radio access network (RAN).

Referring now to FIG. 7, a wireless communication system 10a in which the present invention may be implemented is shown, including a UT 11, a radio access network 12, a core network 14 and a gateway 15, coupled via the gateway to another communications system 10b, such as the Internet, wireline communication systems (including the so-called plain old telephone system), and/or other wireless communication systems. The radio access network includes a wireless terminal 12a (e.g. a Node B or a BTS) and a controller 12b (e.g. a RNC or a BSC). The controller is in wireline communication with the core network. The core network typically includes a mobile switching center (MSC) for circuit-switched communication, and a serving general packet radio service (GPRS) support node (SGSN) for packet-switched communication.

Figure 8:
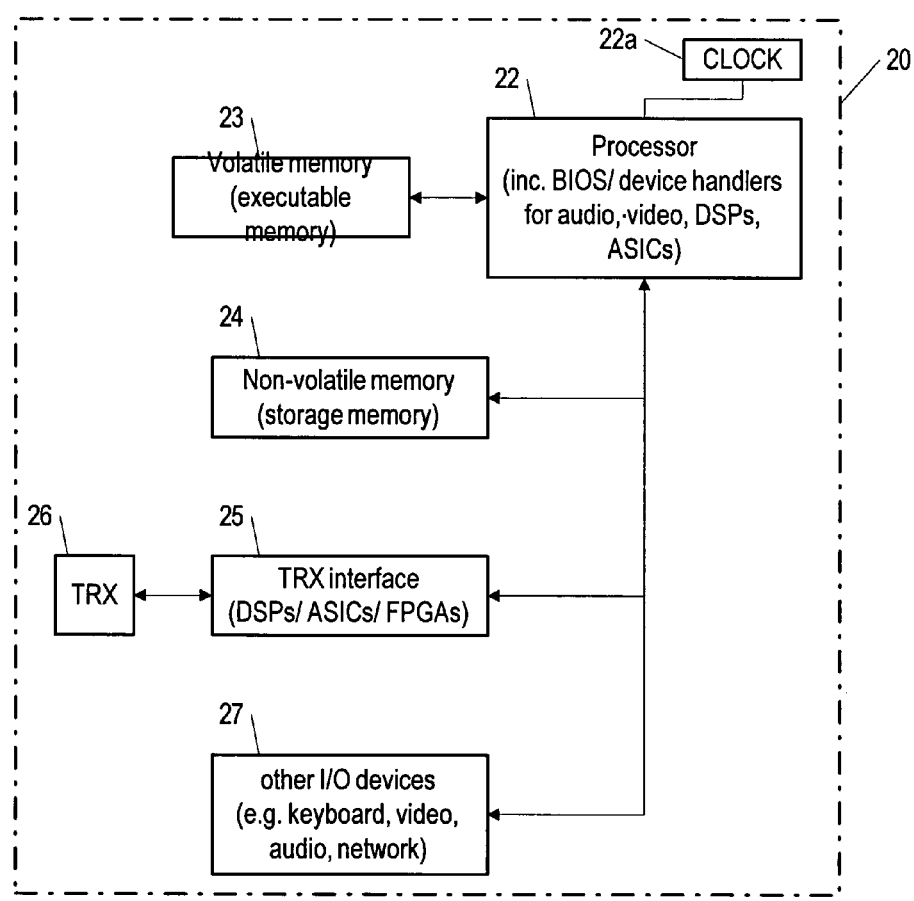
FIG. 8 is a reduced block diagram (only portions relevant to the invention being shown) of the UT or the wireless terminal of the RAN of FIG. 7.

FIG. 8 shows some components of a communication terminal 20, which could be either the UT 11 or the RAN wireless terminal 12a of FIG. 7. The communication terminal includes a processor 22 for controlling operation of the device, including all input and output. The processor, whose speed/timing is regulated by a clock 22a, may include a BIOS (basic input/output system) or may include device handlers for controlling user audio and video input and output as well as user input from a keyboard. The BIOS/device handlers may also allow for input from and output to a network interface card. The BIOS and/or device handlers also provide for control of input and output to a transceiver (TRX) 26 via a TRX interface 25 including possibly one or more digital signal processors (DSPs), application specific integrated circuits (ASICs), and/or field programmable gate arrays (FPGAs). The TRX enables communication over the air with another similarly equipped communication terminal.

Still referring to FIG. 8, the communication terminal includes volatile memory, i.e. so-called executable memory 23, and also non-volatile memory 24, i.e. storage memory. The processor 22 may copy applications (e.g. a calendar application or a game) stored in the non-volatile memory into the executable memory for execution. The processor functions according to an operating system, and to do so, the processor may load at least a portion of the operating system from the storage memory to the executable memory in order to activate a corresponding portion of the operating system. Other parts of the operating system, and in particular often at least a portion of the BIOS, may exist in the communication terminal as firmware, and are then not copied into executable memory in order to be executed. The booting up instructions are such a portion of the operating system.

Figure 9:
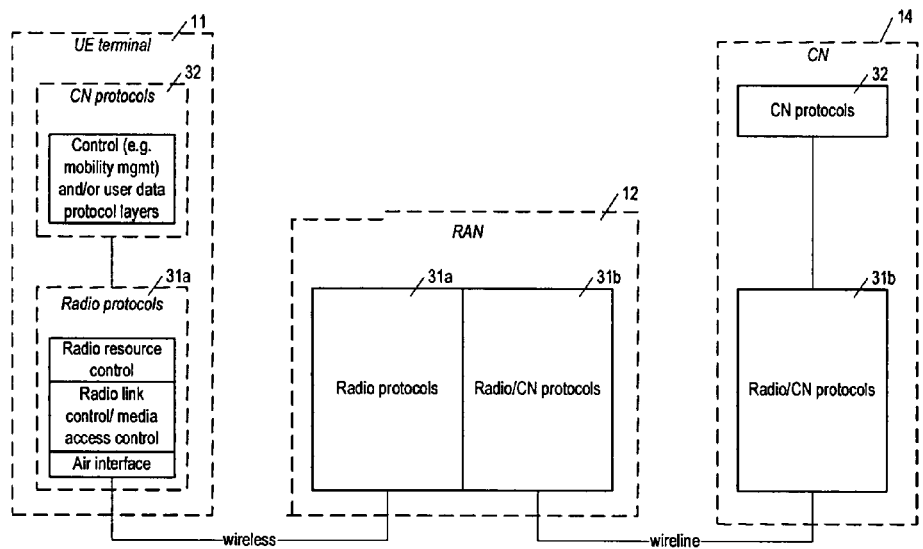
FIG. 9 is a reduced block diagram of two communications terminals of FIG. 7 in terms of a multi-layered communication protocol stack.

Referring now to FIG. 9, the wireless communication system of FIG. 7 is shown from the perspective of layers of a protocol according to which communication is performed. The layers of protocol form a protocol stack, and include CN protocol layers 32 located in the UT 11 and CN 14, and radio protocol layers 31a located in the UT and in the RAN 12 (in either the RAN wireless terminal 12a or the RAN controller 12b). Communication is peer-to-peer. Thus, a CN protocol layer in the UT communicates with a corresponding layer in the CN, and vice versa, and the communication is provided via lower/intervening layers. The lower/intervening layers thus provide as a service to the layer immediately above them in the protocol stack the packaging or unpackaging of a unit of communication (a control signal or user data).

The CN protocols typically include one or more control protocol layers and/or user data protocol layers (e.g. an application layer, i.e. the layer of the protocol stack that interfaces directly with applications, such as a calendar application or a game application).

The radio protocols typically include a radio resource control (protocol) layer, which has as its responsibilities, among quite a few others, the establishment, reconfiguration, and release of radio bearers. Another radio protocol layer is a radio link control/media access control layer (which may exist as two separate layers). This layer in effect provides an interface with the physical layer, another of the radio access protocol layers, and the layer that enables actual communication over the air interface.

The radio protocols are located in the UT and in the RAN, but not the CN. Communication with the CN protocols in the CN is made possible by another protocol stack in the RAN, indicated as the radio/CN protocols stack. Communication between a layer in the radio/CN protocols stack and the radio protocols stack in the RAN may occur directly, rather than via intervening lower layers. There is, as shown in FIG. 9, a corresponding radio/CN protocols stack located in the CN, allowing then communication between the application level in the UT and the application level in the CN.

Figure 10:
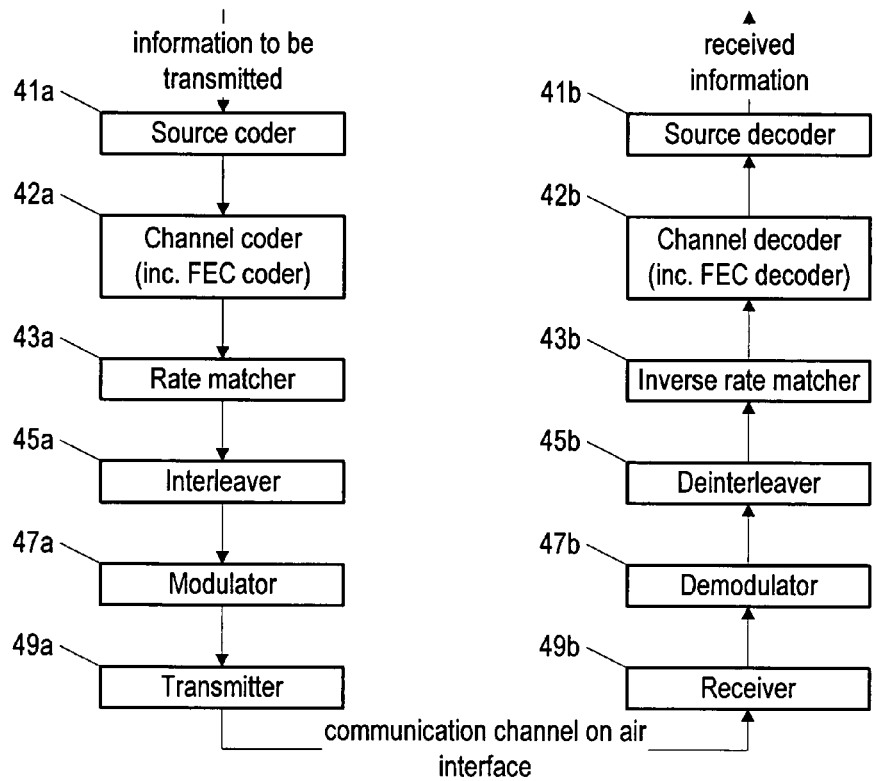
FIG. 10 is a reduced block diagram of the user equipment terminal and the wireless terminal of the radio access network in terms of functional blocks corresponding to hardware equipment used in sending and receiving communication signals over an air interface communication channel linking the two communications terminals.
Figure 11:
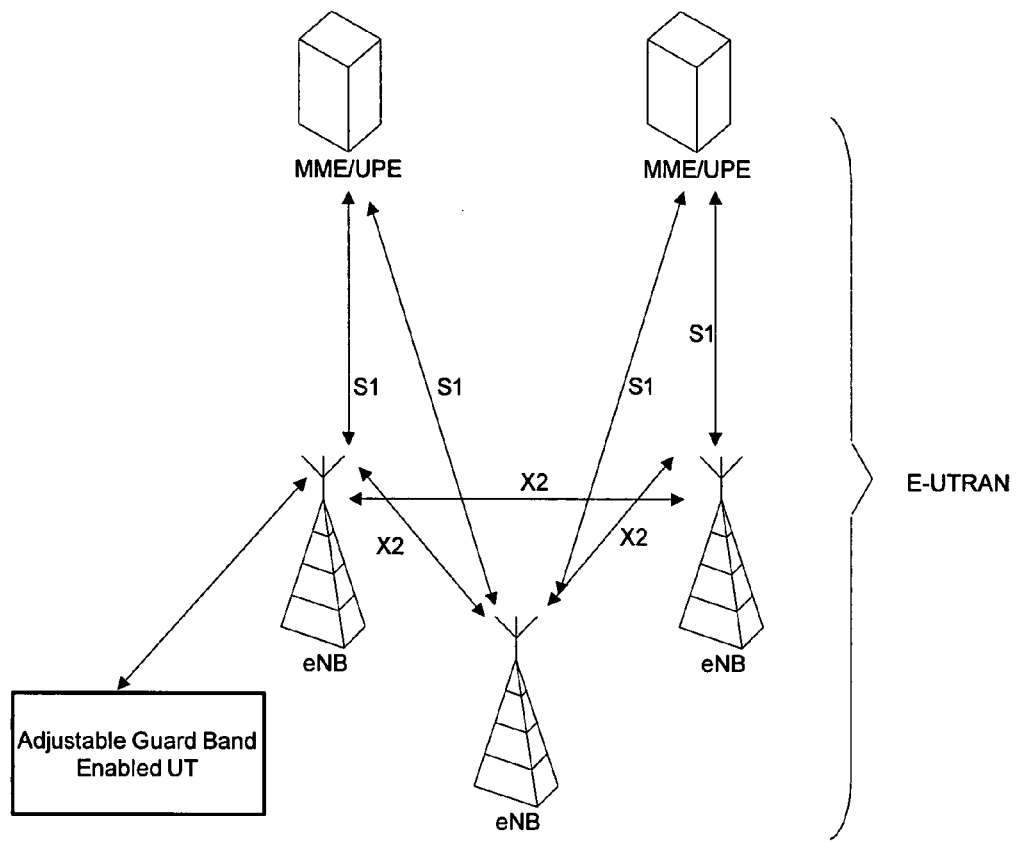
FIG. 11 shows an example of an E-UTRAN architecture with which an adjustable guard band enabled UT according to some embodiments of the invention may be used.

FIG. 10 is a reduced block diagram of the UT communication terminal 11 and the RAN wireless communication terminal 12a of FIG. 7, in terms of functional blocks corresponding to typically hardware (but in some cases software) equipment used in sending and receiving communication signals over a communication channel linking the two communications terminals 11 12a. Both typically include a source coder 41a responsive to information to be transmitted, and a corresponding source decoder 41b. The source coder removes redundancy in the information not needed to communicate the information. Both also include a channel coder 42a and a corresponding channel decoder 42b. The channel coder typically adds redundancy that can be used to correct error, i.e. it performs forward error correction (FEC) coding. Both communication terminals also include a rate matcher 43a and corresponding inverse rate matcher 43b. The rate matcher adds or removes (by so-called puncturing) bits from the bit stream provided by the channel coder, in order to provide a bit stream at a rate compatible with the physical channel being used by the communication terminals. Both communication terminals also include an interleaver 45a and a deinterleaver 45b. The interleaver reorders bits (or blocks of bits) so that strings of bits representing related information are not contiguous in the output bit stream, thus making the communication more resistant to so-called bursty errors, i.e. to errors from temporary causes and so that affect the communication for only a limited time, and so affect only a portion of the communicated bit stream. Both communication terminals also include a modulator 47a and a demodulator 47b. The modulator 47a maps blocks of the bits provided by the interleaver to symbols according to a modulation scheme/mapping (per a symbol constellation). The modulation symbols thus determined are then used by a transmitter 49a included in both communication terminals, to modulate one or more carriers (depending on the air interface, e.g. WCDMA, TDMA, FDMA, OFDM, OFDMA, CDMA2000, etc.) for transmission over the air. Both communication terminals also include a receiver 49b that senses and so receives the communication terminal and determines a corresponding stream of modulation symbols, which it passes to the demodulator 47b, which in turn determines a corresponding bit stream (possibly using FEC coding to resolve errors), and so on, ultimately resulting in a providing of received information (which of course may or may not be exactly the transmitted information). Usually, the channel decoder includes as components processes that provide so-called HARQ (hybrid automatic repeat request) processing, so that in case of an error not able to be resolved on the basis of the FEC coding by the channel coder, a request is sent to the transmitter (possibly to the channel coder component) to resend the transmission having the unresolvable error.

As stated herein above, the invention may be used in any wireless system including but not limited to B3G wireless systems for example, Long Term Evolution (LTE) (also known as 3.9G), which refers to research and development involving the Third Generation Partnership Project (3GPP) aimed at identifying technologies and capabilities that can improve systems such as the UMTS.

Generally speaking, a prefix of the letter "E" in upper or lower case signifies LTE, although this rule may have exceptions. The E-UTRAN consists of eNBs (E-UTRAN Node B), providing the E-UTRA user plane (RLC/MAC/PHY) and control plane (RRC) protocol terminations towards the UE. The eNBs interface to the access gateway (aGW) via the S1, and are inter-connected via the X2.

An example of the E-UTRAN architecture is illustrated in FIG. 10. This example of E-UTRAN consists of eNBs, providing the E-UTRA user plane (RLC/MAC/PHY) and control plane (RRC) protocol terminations towards the UE.

The eNBs are interconnected with each other by means of the X2 interface. The eNBs are also connected by means of the S1 interface to the EPC (evolved packet core) more specifically to the MME (mobility management entity) and the UPE (user plane entity). The S1 interface supports a many-to-many relation between MMEs/UPEs and eNBs. The S1 interface supports a functional split between the MME and the UPE. The MMU/UPE in the example of FIG. 10 is one option for the access gateway (aGW).

In the example of FIG. 10, there exists an X2 interface between the eNBs that need to communicate with each other. For exceptional cases (e.g. inter-PLMN handover), LTE_ACTIVE inter-eNB mobility is supported by means of MME/UPE relocation via the S1 interface.

The eNB may host functions such as radio resource management (radio bearer control, radio admission control, connection mobility control, dynamic allocation of resources to UEs in both uplink and downlink), selection of a mobility management entity (MME) at UE attachment, routing of user plane data towards the user plane entity (UPE), scheduling and transmission of paging messages (originated from the MME), scheduling and transmission of broadcast information (originated from the MME or O&M), and measurement and measurement reporting configuration for mobility and scheduling. The MME/UPE may host functions such as the following: distribution of paging messages to the eNBs, security control, IP header compression and encryption of user data streams; termination of U-plane packets for paging reasons; switching of U-plane for support of UE mobility, idle state mobility control, SAE bearer control, and ciphering and integrity protection of NAS signaling.

The functionality described above (for both the radio access network and the UT) can be implemented as software modules stored in a non-volatile memory, and executed as needed by a processor, after copying all or part of the software into executable RAM (random access memory). Alternatively, the logic provided by such software can also be provided by an ASIC (application specific integrated circuit). In case of a software implementation, the invention provided as a computer program product including a computer readable storage structure embodying computer program code—i.e. the software—thereon for execution by a computer processor.

It is to be understood that the above-described arrangements are only illustrative of the application of the principles of the present invention. Numerous modifications and alternative arrangements may be devised by those skilled in the art without departing from the scope of the present invention of which:

LIST OF ABBREVIATIONS

ACI: Adjacent Channel Interference
ACPR: Adjacent channel power ratio
AP: Access Point
B3G: Beyond 3rd Generation
CHUNK: Basic time-frequency resource unit
DL: Downlink
FDD: Frequency division duplex
LTE: Long Term Evolution
MT: Mobile Terminal
NB: Narrowband (FDD mode of the WINNER system)
OFDM: Orthogonal Frequency Division Multiplexing
RAN: Radio Access Network
TDD: Time division duplex
UL: Uplink
UT: User Terminal
WB: Wideband (TDD mode of the WINNER system)
WLAN: Wireless Local Area Network
WINNER: Wireless World Initiative New Radio

The invention claimed is:

1. Method performed by a processor, comprising:
dynamically varying a carrier separation or guard band between two carriers in a wireless communication system in response to a triggering of or a periodic dynamic change request of the guard band;
determining, in response to the triggering of or the periodic dynamic change request, a number of users and a respective Quality of Service associated with each user of the number of users;
calculating a tolerable overlap of the guard bands between the two carriers;
selecting in response to the tolerable overlap a lowest Quality of Service data or user requirement criteria and a highest Quality of Service data or user requirement criteria;
positioning the lowest Quality of Service data or user requirement criteria to the edge of one of the carriers, and positioning the highest Quality of Service data or user requirement criteria towards the middle of one of the carriers;
determining an amount of frequency spectrum available for usage in the guard band;
expanding or reducing bandwidth of the two carriers to increase or decrease the separation between the two carriers, and
calculating an Adjacent Channel Interference level between the two carriers.

2. The method according to claim 1 further comprising the two carriers belonging to a single operator.

3. The method according to claim 1 further comprising each carrier of the two carries belonging to different operators.

4. The method according to claim 1 further comprising positioning the Quality of Service data in accordance with the available guard band spectrum.

5. The method according to claim 3 further comprising the different operators synchronizing and coordinating their respective chunks such that the data can be encoded with a lower coding rate to accommodate the higher adjacent channel interference level expected on the edge of the guard band for "fine tuning" the separation of the carriers.

6. The method according to claim 1 further comprising implementing flexible spectrum use in response to one carrier reducing its used bandwidth by releasing spectrum and the other carrier expanding its used bandwidth by using the released spectrum.

7. The method according to claim 1 wherein the wireless communication system is a frequency division duplex system.

8. The method according to claim 1 wherein the wireless communication system is a time division duplex system.

9. A device, terminal or node, comprising:
a triggering module configured to initiate a dynamic change request of a guard band between two carriers of a different or a same operator;
a guard band overlap module configured to determine a tolerable overlap for adjacent channel interference between the two carriers;
a bandwidth adjusting module configured to expand or reduce a bandwidth of the two carriers to achieve a carrier separation as a function of Quality of Service; and
a data positioning module configured to position data in accordance to its Quality of Service and in accordance with an available guard band frequency spectrum, wherein data with a lowest Quality of Service is positioned towards an edge of one of the carriers, and data with a highest Quality of Service is positioned towards a middle of one of the carriers.

10. The device, terminal or node according to claim 9 further comprising a frequency spectrum determining module configured to calculate the amount of frequency spectrum available for usage in the guard band.

11. Apparatus, comprising:
at least one processor and at least one memory including program code, the at least one memory and the computer code configured to, with the at least one processor, cause the apparatus at least to
initiate a dynamic change request of a guard band between two carriers in a wireless communication system to allow for flexible spectrum use between the carriers,
determine a number of users and a respective Quality of Service associated with each user of the number of users;
determine a tolerable guard band overlap for adjacent channel interference between the carriers,
select in response to the tolerable guard band overlap a lowest Quality of Service data and a highest Quality of Service data;
expand or reduce a bandwidth of the two carriers to increase or decrease a separation between the two carriers; and positioning the lowest Quality of Service data at an edge of one of the carriers and the highest Quality of Service data in a middle of one of the carriers to minimize any impact from the adjacent channel interference due to guard band overlap.

12. A computer program product comprising a computer readable storage structure embodying computer program code therein that, when executed by a computer processor perform dynamically varying a carrier separation or a guard band between two carriers of a same operator or different operators by the triggering of or the periodic dynamic change of the guard band, responding to the triggering of or the periodic dynamic change request by determining a number of users and a respective Quality of Service associated with each user of the number of users, calculating a tolerable overlap of the guard bands between the carriers, selecting in response to the tolerable guard band overlap a lowest Quality of Service data or user requirement criteria and a highest Quality of Service data or user requirement criteria, positioning the lowest Quality of Service data or user requirement criteria to an edge of one of the carriers and positioning the highest Quality of Service data or user requirement criteria towards a middle of one of the carriers, determining an amount of spectrum available for usage in the guard band, expanding or reducing an bandwidth of the carriers to achieve a predetermined separation, and calculating an adjacent channel interference level.

13. A method according to claim 1, wherein the method further comprises implementing the steps of the method via a computer program running in a processor, controller or other suitable module in one or more devices, terminals or nodes in the wireless communication network such that, when executed by said processor, controller or other suitable module in said one or more devices, cause the device at least to perform the steps of the method.

14. An application specific integrated circuit configured to operate according to the method of claim 1.

* * * * *

UNITED STATES PATENT AND TRADEMARK OFFICE
CERTIFICATE OF CORRECTION

| | | |
|---|---|---|
| PATENT NO. | : 7,949,343 B2 | Page 1 of 1 |
| APPLICATION NO. | : 11/901956 | |
| DATED | : May 24, 2011 | |
| INVENTOR(S) | : Jean-Philippe Kermoal and Kari Hooli | |

It is certified that error appears in the above-identified patent and that said Letters Patent is hereby corrected as shown below:

In column 8, line 63, which is claim 3, line 2, "carries" should be --carriers--.

Signed and Sealed this
Twenty-seventh Day of September, 2011

David J. Kappos
*Director of the United States Patent and Trademark Office*